(No Model.)
H. C. STIFEL.
BOWL FOR WATER CLOSETS.
No. 516,133. Patented Mar. 6, 1894.
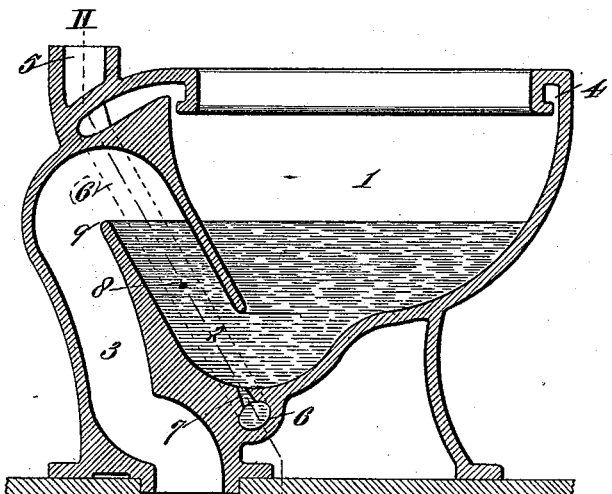
Fig. I.
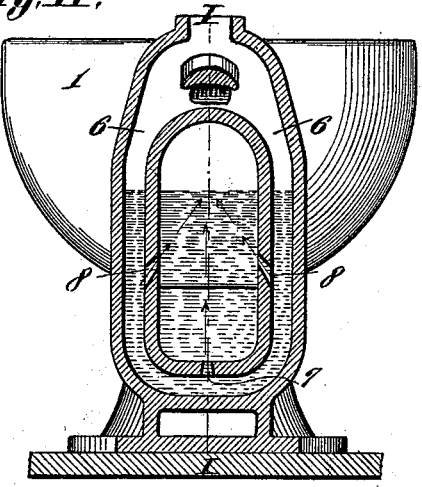
Fig. II.
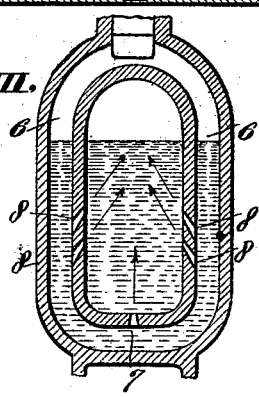
Fig. III.
Attest:
A. W. Ebersole
G. E. Ebersole
Inventor:
H. C. Stifel
By Wright Bros
Atty's

UNITED STATES PATENT OFFICE.

HERMAN C. STIFEL, OF ST. LOUIS, MISSOURI, ASSIGNOR TO THE STIFEL-O'NEIL HOME COMFORT CO., OF SAME PLACE.

BOWL FOR WATER-CLOSETS.

SPECIFICATION forming part of Letters Patent No. 516,133, dated March 6, 1894.

Application filed September 25, 1893. Serial No. 486,396. (No model.)

*To all whom it may concern:*

Be it known that I, HERMAN C. STIFEL, of the city of St. Louis, in the State of Missouri, have invented a certain new and useful Improvement in Bowls for Water-Closets, of which the following is a full, clear, and exact description, reference being had to the accompanying drawings, forming part of this specification.

My present invention relates to that class of bowls in which a jet of water is applied to the trap for the purpose of lifting the water therein, in flushing the bowl.

My invention consists in features of novelty hereinafter fully described and pointed out in the claim.

Figure I is a vertical section of my improved bowl, taken on line I—I, Fig. II. Fig. II is a section taken on line II—II, Fig. I, and Fig. III is a detail section, illustrating a slight modification.

Referring to the drawings, 1 represents the body of the bowl, 2 the trap, and 3 the discharge conduit of the bowl. The bowl itself may be of any ordinary form or construction wherein a trap is employed, and I have shown the form of bowl having a flush rim 4, into which the water is discharged from the supply pipe 5. A portion of the water from the supply pipe is conducted through a passage 6 to the under side or bottom of the trap, and there may be, and preferably is one of these passages on each side of the bowl, as shown in Fig. II. The passage 6 communicates with the bottom of the trap 2, through means of a jet opening 7, and water passing through this jet opening acts to lift the water from the trap into the discharge conduit when the bowl is flushed, thus starting a circulation through the bowl. This passage 6, with the opening 7 is old, and I do not claim anything in these parts *per se*, but I have discovered that by making one or more jet openings 8 between the passage 6 and the trap of the bowl above the opening 7, and preferably about mid-way between the opening 7 and the upper end of the trap or discharge point 9, the operation of this class of bowl is materially improved.

In Fig. II I have shown one of these jet openings in each of the two passages 6, while in Fig. III I have shown two openings in each passage; one or more may be used in each passage, and as already stated one passage 6 alone may be used. These jet openings are formed so as to present upwardly, so that the water entering therethrough is directed in an upwardly course, as shown by the arrows in Fig. II, to more effectually lift or raise the water in the trap. I have discovered that by the use of these auxiliary jet openings, a given flow of water, distributed between these openings and the openings 7 at the bottom of the trap, will much more effectually lift the water in the trap, and create a quick and forcible circulation of water through the bowl, than is the case where the openings 7 alone are used; and in addition to this advantage, there is afforded the possibility of a larger discharge of water from the passage 6 into the trap, than is possible with but one opening located at the bottom of the trap only.

I claim as my invention—

A bowl for water closets, having a trap 2, passages 6 leading from the supply pipe to beneath the trap, and having an opening 7, at the bottom of the trap, and inclined openings 8 in the walls of the passages 6 between the bottom and top of the trap, substantially as set forth.

HERMAN C. STIFEL.

In presence of—
 A. M. EBERSOLE,
 G. E. EBERSOLE.